United States Patent
Ronda et al.

(10) Patent No.: US 8,057,702 B2
(45) Date of Patent: Nov. 15, 2011

(54) PROCEDURE TO OBTAIN $Gd_2O_2S$: PR FOR CT WITH A VERY SHORT AFTERGLOW

(75) Inventors: Cornelis Reinder Ronda, Aachen (DE); Gunter Zeitler, Aachen (DE); Dieter Wadow, Aachen (DE); Herfried Wieczorek, Aachen (DE); Herbert Schreinemachen, Baesweiler (DE)

(73) Assignee: Koninklijke Philips Electronics N.V. (NL)

( * ) Notice: Subject to any disclaimer, the term of this patent is extended or adjusted under 35 U.S.C. 154(b) by 609 days.

(21) Appl. No.: 11/911,724

(22) PCT Filed: Apr. 13, 2006

(86) PCT No.: PCT/IB2006/051157
§ 371 (c)(1),
(2), (4) Date: Oct. 17, 2007

(87) PCT Pub. No.: WO2006/111900
PCT Pub. Date: Oct. 26, 2006

(65) Prior Publication Data
US 2008/0179566 A1    Jul. 31, 2008

(30) Foreign Application Priority Data
Apr. 19, 2005   (EP) ..................................... 05103102

(51) Int. Cl.
*C09K 11/84*   (2006.01)
*C01F 17/00*   (2006.01)

(52) U.S. Cl. .................................. 252/301.4 S; 501/152
(58) Field of Classification Search ............ 252/301.4 S; 501/152
See application file for complete search history.

(56) References Cited

U.S. PATENT DOCUMENTS

| | | | |
|---|---|---|---|
| 3,974,389 A * | 8/1976 | Ferri et al. ................. 250/483.1 |
| 4,507,560 A * | 3/1985 | Mathers et al. ............ 250/483.1 |
| 5,296,163 A * | 3/1994 | Leppert et al. .......... 252/301.4 S |
| 5,518,659 A   | 5/1996 | Rossner et al. |
| 5,811,924 A   | 9/1998 | Okumura et al. |
| 6,093,347 A   | 7/2000 | Lynch et al. |
| 6,340,436 B1  | 1/2002 | Yamada et al. |
| 7,728,302 B2 * | 6/2010 | Zeitler et al. ............. 250/370.11 |
| 2003/0173532 A1 * | 9/2003 | Takahashi et al. ............ 250/584 |

FOREIGN PATENT DOCUMENTS
DE   4402258 C2   7/1995
JP   04236292 A   8/1992
WO   WO 2005/110943   * 11/2005

OTHER PUBLICATIONS

Shepherd, J. A., et al.; Study of afterglow in x-ray phosphors for use on fast-framing charge-coupled device detectors; 1997; Optical Engineering, Soc. of Photo-Optical Instrumentation Engineers; 36(11)3211-3222.

* cited by examiner

*Primary Examiner* — Carol M Koslow

(57) ABSTRACT

The present invention is directed to a $Gd_2O_2S$:M fluorescent ceramic material with a very short afterglow, wherein M represents at least one element selected from the group Pr, Th, Yb, Dy, Sm and/or Ho and the $Gd_2O_2S$:M fluorescent ceramic material comprises further:

europium of $\leq 1$ wt. ppm based on $Gd_2O_2S$, and cerium of $\geq 0.1$ wt. ppm to $\leq 100$ wt. ppm based on $Gd_2O_2S$, wherein the content of cerium is in excess of the content of europium with a ratio of europium to cerium of 1:10 to 1:150.

17 Claims, No Drawings

PROCEDURE TO OBTAIN GD$_2$O$_2$S: PR FOR CT WITH A VERY SHORT AFTERGLOW

The present invention is directed to a gadolinium containing powder contaminated with europium as well as a fluorescent ceramic contaminated with europium.

The invention further relates to a method for manufacturing a fluorescent ceramic using single-axis hot pressing.

The invention still further relates to a detector for detecting ionizing radiation.

The invention still further relates to a use of said detector for detecting ionizing radiation.

Fluorescent members for detecting high energy radiation contain a phosphor that can absorb the radiation and convert it into visible light. The luminescent emission thereby generated is electronically acquired and evaluated with the assistance of light sensitive systems such as photodiodes or photomultipliers. Such fluorescent members can be manufactured of single-crystal materials, for example, doped alkali halides. Non-single-crystal materials can be employed as powdered phosphor or in the form of ceramic members manufactured there from.

In U.S. Pat. No. 6,340,436 B1 a phosphor is described represented by the general formula $(L_{1-x-y-z-d}Eu_xCe_zM'_d)_2O_2S$ (wherein L is at least one element selected from the group consisting of Gd, La and Y, M is at least one element selected from the group consisting of Th and Pr, M' is at least one element selected from the group consisting of Ca, Sr and Zn, and x, y, z and d are values falling in the ranges of $0.001 \leq x \leq 0.06$, $0 < y \leq 12 \times 10^{-5}$, $0 < z \leq 12 \times 10^{-5}$, and $0 \leq d \leq 2.5 \times 10^{-4}$ and manufactured by the hot hydrostatic pressing method. The phosphor has a high light permeability, a high luminous efficacy and a reduced afterglow. A radiation detector comprising a combination of this phosphor with silicon photodiode has an excellent wave length matching capability, is capable of obtaining a high luminous output, and is suitably used as an X-ray detector of an X-ray CT unit or the like.

However, it has been found by the inventors that Gd$_2$O$_2$S:Pr fluorescent ceramic containing europium can exhibit an undesirable increased afterglow characteristic. Thus, there is a need to overcome this drawback.

A first object of the present invention is to provide a scintillating ceramic containing europium with very short afterglow characteristics.

The above described object can be achieved according to the present invention by a Gd$_2$O$_2$S:M fluorescent ceramic material with a very short afterglow, wherein M represents at least one element selected from the group Pr, Th, Yb, Dy, Sm and/or Ho and the Gd$_2$O$_2$S:M fluorescent ceramic material comprises additional:

europium of $\leq 1$ wt. ppm, based on Gd$_2$O$_2$S and
cerium of $\geq 0.1$ wt. ppm to $\leq 100$ wt. ppm, preferably $\leq 50$ wt. ppm, based on Gd$_2$O$_2$S, wherein the content of cerium is in excess of the content of europium with a ratio of europium to cerium of 1:10 to 1:150.

However, it can be preferred that the Gd$_2$O$_2$S:M fluorescent ceramic material comprises europium of >0.05 wt. ppm and $\leq 1$ wt. ppm, based on Gd$_2$O$_2$S.

If the amount of europium, such as Eu$^{3+}$, contained in the fluorescent ceramic material is too high, an undesirable high afterglow is obtained. Further, a too high concentration of europium, such as Eu$^{3+}$, contained in the fluorescent ceramic material leads to an undesirable decrease of light efficiencies if cerium, such as Ce$^{3+}$, is contained in an amount described according to the present invention. It is important to match the cerium concentration, such as Ce$^{3+}$, since a too low concentration leads to an undesirable high afterglow. However, if the cerium concentration, such as Ce$^{3+}$, is too high the light efficiency is undesirable low.

It can be preferred that the cerium concentration, such as Ce$^{3+}$, in the Gd$_2$O$_2$S:M fluorescent ceramic material is at least 5 wt. ppm and at most 100 wt. ppm, preferably at most 50 wt. ppm and more preferred at most 25 wt. ppm.

In the present description M represents at least one element selected from the group Pr, Th, Yb, Dy, Sm and/or Ho.

A preferred Gd$_2$O$_2$S:M fluorescent ceramic material according to the present invention is Gd$_2$O$_2$S:Pr comprising cerium in excess of the content of europium.

The introduction of Pr or Ce ions can be carried out using aqueous solutions of corresponding salts: PrCl$_3$, PrBr$_3$, PrI$_3$, Pr(NO$_3$)$_3$, Pr$_2$(SO$_4$)$_3$, CeCl$_3$, CeBr$_3$, CeI$_3$, Ce(NO$_3$)$_3$, Ce$_2$(SO$_4$)$_3$, etc. Alternatively, the introduction of dopant ions can be carried out during a mechanical mixture of gadolinium containing powders, such as Gd$_2$O$_2$S, with insoluble compositions comprising the dopant, like oxides, for example Pr$_6$O$_{11}$, Pr$_2$O$_3$, Ce$_2$O$_3$, CeO$_2$.

Still alternatively gadolinium containing powders, such as Gd$_2$O$_2$S powder, may be mechanically mixed with water insoluble salts of the dopant, like PrF$_3$, Pr$_2$S$_3$, Pr$_2$O$_2$S, Pr$_2$(CO$_3$)$_3$, Pr$_2$(C$_2$O$_4$)$_3$, CeF$_3$, Ce$_2$O$_2$S, Ce$_2$(CO$_3$)$_3$, Ce$_2$(C$_2$O$_4$)$_3$, and the like.

The doped pigment powder of Gd$_2$O$_2$S can have a surface according to BET in the range of $\geq 0.01$ m$^2$/g and $\leq 1$ m$^2$/g, preferably of $\geq 0.05$ m$^2$/g and $\leq 0.5$ m$^2$/g and more preferably of $\geq 0.1$ m$^2$/g and $\leq 0.2$ m$^2$/g.

In general, gadolinium containing powders, like Gd$_2$O$_3$, are used for the manufacture of Gd$_2$O$_2$S:M fluorescent ceramic materials. The process for the preparation of Gd$_2$O$_3$ and of Gd$_2$O$_2$S:M fluorescent ceramic materials is complex and time consuming. However, the characteristics with respect to afterglow and other physical properties cannot be altered arbitrarily for the fluorescent ceramic material once prepared. In order to provide a Gd$_2$O$_2$S:M fluorescent ceramic material with a very short afterglow it has been found that the content of cerium should be in excess of the content of europium in a Gd$_2$O$_2$S:M fluorescent ceramic material according to the present invention.

However, to obtain the desired very brief afterglow of the Gd$_2$O$_2$S:M fluorescent ceramic material according to the present invention it can be preferred that the amount of:

europium is $\geq 0.05$ wt. ppm and $\leq 1$ wt. ppm, preferably of $\geq 0.1$ wt. ppm and $\leq 0.5$ wt. ppm, based on Gd$_2$O$_2$S, and
cerium is $\geq 0.1$ wt. ppm to $\leq 100$ wt. ppm, preferably of $\geq 1$ wt. ppm to $\leq 50$ wt. ppm, and more preferred of $\geq 10$ wt. ppm to $\leq 25$ wt. ppm, based on Gd$_2$O$_2$S, wherein the content of cerium is in excess of the content of europium.

Europium can be contained as Eu$^{3+}$, preferably as salt, for example EuCl$_3$, EuF$_3$, Eu$_2$O$_2$S, Eu$_2$(CO$_3$)$_3$, Eu$_2$(C$_2$O$_4$)$_3$, and the like. Cerium can be contained as Ce$^{3+}$, preferably as salt, for example CeCl$_3$, CeF$_3$, Ce$_2$O$_2$S, Ce$_2$(CO$_3$)$_3$, Ce$_2$(C$_2$O$_4$)$_3$, and the like.

The reduction of afterglow can be further optimized in that the content of europium and cerium of the Gd$_2$O$_2$S:M fluorescent ceramic material is adjusted at a ratio of europium to cerium of 1:20 to 1:100, preferably 1:25 to 1:75, more preferred 1:20 to 1:50 and most preferred about 1:25.

A Gd$_2$O$_2$S:M fluorescent ceramic material according to the present invention, in particular Gd$_2$O$_2$S:Pr, comprising cerium in excess of the content of europium can exhibit an afterglow of >0 ppm at 0.5 s and $\leq 80$ ppm at 0.5 s and preferably $\geq 17$ ppm at 0.5 s and $\leq 20$ ppm at 0.5 s.

However, it is preferred that a $Gd_2O_2S$:M fluorescent ceramic material according to the present invention, in particular $Gd_2O_2S$:Pr, comprising cerium in excess of the content of europium can exhibit an afterglow of >0 ppm at 0.5 s and ≦50 ppm at 0.5 s, preferably ≧5 ppm at 0.5 s and ≦40 ppm at 0.5 s, further preferred ≧10 ppm at 0.5 s and ≦30 ppm at 0.5 s and more preferred ≧15 ppm at 0.5 s and ≦25 ppm at 0.5 s.

An $Gd_2O_2S$:M fluorescent ceramic material according to the present invention, in particular $Gd_2O_2S$:Pr, with an Eu:Ce ratio of 1:10 to 1:150, preferably 1:50, can exhibit an afterglow of ≦80 ppm at 0.5 s. Further, an afterglow of ≦20 ppm at 0.5 s can be achieved if the $Gd_2O_2S$:M fluorescent ceramic material according to the present invention comprises ≧0.2 wt. ppm $Eu^{3+}$ to ≦0.5 wt. ppm $Eu^{3+}$ and ≧10 wt. ppm $Ce^{3+}$ to ≦25 wt. ppm $Ce^{3+}$, preferably 20 wt. ppm $Ce^{3+}$ to 23 wt. ppm $Ce^{3+}$, based on said fluorescent ceramic material.

Thus, it can be preferred to adjust the Eu:Ce ratio in the gadolinium containing pigment powder that said powder comprises ≧0.2 wt. ppm $Eu^{3+}$ to ≦0.5 wt. ppm $Eu^{3+}$ and ≧10 wt. ppm $Ce^{3+}$ to ≦25 wt. ppm $Ce^{3+}$, preferably 20 wt. ppm $Ce^{3+}$ to 23 wt. ppm $Ce^{3+}$, based on said fluorescent ceramic material.

A $Gd_2O_2S$:M fluorescent ceramic material according to the present invention, in particular $Gd_2O_2S$:Pr, comprising cerium in excess of the content of europium can exhibit a relative light yield in the range of >120% and preferably more than 230% of the light output of $CdWO_4$.

Light output and afterglow was measured with a Hamamatsu PMT and a National Instruments ADC, whereby the photomultiplier is shielded against direct irradiation by lead shield. The afterglow was measured with 120 kV/100 mA, 80 cm FDD (18-20 mGy/s), 2 s pulse, whereby all afterglow values are given in ppm of stationary signal. The signal values (light output) were measured on 4×4 $mm^2$ pixels, silicone glued to a photodiode. The afterglow is measured after the X-ray pulse has been switched off.

The $Gd_2O_2S$:M fluorescent ceramic material according to the present invention can be transparent. Due to the content of cerium the $Gd_2O_2S$:M fluorescent ceramic material is yellow colored.

The transmission of the $Gd_2O_2S$:M fluorescent ceramic material at the wavelength of own emission at about 515 nm can be 10% to 70%, preferably 20% to 60% and more preferred ≧40% and most preferred ≧50%, with respect to a layer thickness of 1.6 mm. The measurements of total transmission were carried out using a Perkin Elmer spectrometer.

A second object of the present invention is directed to a gadolinium containing pigment powder useful in the manufacture of a $Gd_2O_2S$:M fluorescent ceramic material according to the present invention.

The inventors have surprisingly found that a $Gd_2O_2S$:M fluorescent ceramic material with reduced afterglow can be obtained if a gadolinium containing pigment powder is used comprising europium and cerium in a defined ratio.

According to the present invention a gadolinium containing pigment powder useful in the manufacture of a $Gd_2O_2S$:M fluorescent ceramic material can be preferred, wherein the Gd pigment powder material comprises additional:
  europium of ≦1.0 wt ppm based on $Gd_2O_2S$ and
  cerium of ≧0.1 wt ppm to ≦100 wt. ppm, preferably ≦50 wt. ppm, based on $Gd_2O_2S$, wherein
the content of cerium is in excess of the content of europium and/or the content of europium and cerium of the Gd pigment powder is adjusted at a ratio of europium to cerium of 1:10 to 1:150, wherein said gadolinium containing pigment powder is preferably selected from the group comprising $Gd_2O_3$, $Gd_2O_2S$ and/or $Gd_2O_2S$:M.

Preferably, the gadolinium containing pigment powder can be selected from the group comprising $Gd_2O_3$, $Gd_2O_2S$ and/or $Gd_2O_2S$:M, wherein M represents at least one element selected from the group Pr, Th, Yb, Dy, Sm and/or Ho.

It can be preferred that the cerium concentration, such as $Ce^{3+}$, in the gadolinium containing pigment powder selected from the group comprising $Gd_2O_3$, $Gd_2O_2S$ and/or $Gd_2O_2S$:M, is at least 5 wt. ppm and at most 100 wt. ppm, preferably at most 50 wt. ppm and more preferred at most 25 wt. ppm relative to $Gd_2O_2S$.

In general the gadolinium containing pigment powder is contaminated with europium, such as $Eu^{3+}$, of ≧0.05 wt. ppm to ≦1 wt. ppm based on $Gd_2O_2S$. Based on the amount of europium in the gadolinium containing pigment powder the amount of cerium is calculated and added to said powder.

If the gadolinium containing pigment powder comprises ≧0.05 wt. ppm $Eu^{3+}$ to ≦1 wt. ppm $Eu^{3+}$ the amount of Cerium, such as $Ce^{3+}$, added to said powder can be ≧0.1 wt. ppm $Ce^{3+}$ to ≦100 wt. ppm $Ce^{3+}$, preferably ≧1 wt. ppm $Ce^{3+}$ to ≦50 wt. ppm $Ce^{3+}$, preferably ≧10 wt. ppm $Ce^{3+}$ to ≦25 wt. ppm $Ce^{3+}$, based on said $Gd_2O_2S$.

In said gadolinium containing pigment powder the ratio of europium to cerium is adjusted to 1:10 to 1:150, preferably of 1:20 to 1:100, further preferred 1:25 to 1:75, more preferred 1:20 to 1:50 and most preferred about 1:25.

However, it can be preferred that the amount in said gadolinium containing powder of:
  europium is ≧0.05 wt. ppm to ≦1 wt. ppm, preferably of ≧0.1 wt. ppm to ≦0.5 wt. ppm, based on $Gd_2O_2S$, and
  cerium is ≧0.1 wt. ppm to ≦100 wt. ppm, preferably of ≧1 wt. ppm to ≦50 wt. ppm, and more preferred of ≧10 wt. ppm to ≦25 wt. ppm, based on $Gd_2O_2S$, wherein the content of cerium is in excess of the content of europium.

A gadolinium containing pigment powder having a powder grain size of 1 μm to 20 μm can be preferred for use of manufacture of the desired $Gd_2O_2S$:M fluorescent ceramic materials with very short afterglow according to the present invention.

A third object of the present invention is directed to a method for the manufacture of a gadolinium containing pigment powder contaminated by europium to be used in the manufacture of a $Gd_2O_2S$:M fluorescent ceramic material according to the present invention.

The method for the manufacture of a gadolinium containing pigment powder contaminated by europium to be used in the manufacture of a $Gd_2O_2S$:M fluorescent ceramic material with very brief afterglow, comprises the steps:
  a) detecting the amount of europium in said gadolinium containing pigment powder,
  b) adding cerium in excess of the content of europium; so that the content of:
    europium is verified to be ≦1 wt. ppm based on $Gd_2O_2S$, and
    cerium is of ≧0.1 wt. ppm to ≦100 wt. ppm, preferably ≦50 wt. ppm, based on $Gd_2O_2S$,
  wherein the content of europium and cerium of the gadolinium containing pigment powder is adjusted at a ratio of europium to cerium of 1:10 to 1:150.

It can be preferred in the case that the amount of europium, for example $Eu^{3+}$, is less then 0.05 wt. ppm or less then 0.01 wt. ppm based on $Gd_2O_2S$, cerium may not be added to the gadolinium containing pigment powder.

The method according to the present invention provides measures to avoid the manufacture of $Gd_2O_2S$:M (GOS) fluorescent ceramic materials having an undesired sustained afterglow.

Suitable europium, such as $Eu^{3+}$, contaminated gadolinium containing pigment powders can be selected from the group comprising $Gd_2O_3$, $Gd_2O_2S$ and/or $Gd_2O_2S$:M.

Since gadolinium containing pigment powders as mentioned below are often contaminated with europium, such as $Eu^{3+}$, it is suggested by the inventors to detect the quantitative amount of europium in said gadolinium containing pigment powder.

Europium, such as $Eu^{3+}$, contaminated gadolinium containing pigment powders can exhibit a red radiation emission.

Methods for a quantitative analysis of europium, such as $Eu^{3+}$, are general known in the art. According to the method of the present invention the amount of europium, for example, the amount of $Eu^{3+}$, can be measured by use of optical spectroscopy. It is most preferred for $Eu^{3+}$ contaminated gadolinium containing pigment powder to detect the amount of $Eu^{3+}$ based on optical spectroscopy which measure the emission intensity of $Eu^{3+}$ (excitation at about 254 nm UV radiation). An optical spectroscopy method which measures the emission intensity of $Eu^{3+}$ allows an accurate determination of the $Eu^{3+}$ content down to concentrations in the sub ppm range for an $Eu^{3+}$ contaminated gadolinium containing pigment powder.

The emission radiation of europium, such as $Eu^{3+}$, contaminated $Gd_2O_3$ powder at excitation at 254 nm UV—obtained from a low pressure Hg-discharge—radiation provides a red colored visible radiation.

Emission spectra of europium, such as $Eu^{3+}$, contaminated $Gd_2O_2S$:M powders show an emission radiation amongst others in the range of 620 nm to 630 nm.

The concentration of $Eu^{3+}$ is given in wt. ppm based on $Gd_2O_2S$.

In a subsequent step cerium, preferably as $Ce^{3+}$, for example $CeCl_3$, is added in an amount of $\geq 0.1$ wt. ppm to $\leq 100$ wt. ppm, preferably $\leq 50$ wt. ppm, based on $Gd_2O_2S$, wherein the content of europium and cerium in the gadolinium containing pigment powder is adjusted at a ratio of europium to cerium of 1:10 to 1:150.

The ratio of europium to cerium can be adjusted at 1:10 to 1:150, preferably of 1:20 to 1:100, further preferred 1:25 to 1:75, more preferred 1:20 to 1:50 and most preferred about 1:25.

Further, it can be preferred if the amount in said gadolinium containing powder of europium is $\leq 1$ wt. ppm, preferably $\geq 0.05$ wt. ppm to $\leq 0.5$ wt. ppm, based on $Gd_2O_2S$, the added total amount of cerium is $\geq 0.5$ wt. ppm to $\leq 50$ wt. ppm, preferably of $\geq 1$ wt. ppm to $\leq 30$ wt. ppm, and more preferred of $\geq 10$ wt. ppm to $\leq 25$ wt. ppm, based on $Gd_2O_2S$, wherein the content of cerium is in excess of the content of europium. However, the ratio of europium to cerium should be 1:10 to 1:150.

The analysis of the gadolinium containing powder with respect to the concentration of $Eu^{3+}$ has the advantage that the exact amount of cerium, preferably $CeCl_3$, needed to be added to said powder can be calculated. Thus, the manufacture of $Gd_2O_2S$:M fluorescent ceramic materials (GOS) having an undesired sustained afterglow can be avoided. This can fasten the process of manufacture of the desired $Gd_2O_2S$:M fluorescent ceramic materials (GOS) having a very brief afterglow.

A fourth object of the present invention is directed to a method for the manufacture of a fluorescent ceramic material according to the present invention using a single-axis hot-pressing, said method comprising the steps:

a) selecting a pigment powder of $Gd_2O_2S$:M, wherein M represents at least one element selected from the group Pr, Th, Yb, Dy, Sm and/or Ho, comprises additional: europium of $\leq 1$ wt. ppm based on $Gd_2O_2S$, and cerium of $\geq 0.1$ wt. ppm to $\leq 100$ wt. ppm, preferably $\leq 50$ wt. ppm, based on $Gd_2O_2S$, wherein the content of europium and cerium of the gadolinium containing pigment powder is adjusted at a ratio of europium to cerium of 1:10 to 1:150, and the grain size of said powder used for hot-pressing is of 1 μm to 20 μm, and said hot-pressing is carried out at a temperature of 1000° C. to 1400° C.; and/or a pressure of 100 MPa to 300 MPa;

b) air annealing at a temperature of 700° C. to 1200° C. for a time period of 0.5 hours to 30 hours, and optional between step a) and step b) an additional step c) is carried out, whereby step c) comprises annealing fluorescent ceramic under vacuum at a temperature of 1000° C. to 1400° C. for a period of time of 0.5 hours to 30 hours.

The pigment powder of $Gd_2O_2S$ can comprise an amount of M from 0.1 ppm to 1000 ppm (weight fraction).

It has been found out that relatively coarse grained powders which are chemically stable in air can be successfully pressed to form a fluorescent crystal with improved characteristics.

Thus, according to the present invention it can be preferred that the pressing mode is at a temperature of 1000° C. to 1400° C., preferably of 1100° C. to 1300° C., more preferably of 1150° C. to 1250° C.; and/or a pressure of 100 MPa to 300 MPa, preferably of 180 MPa to 280 MPa and more preferably of 200 MPa to 250 MPa. Preferably, the vacuum during the step of uni-axial pressing according to the present invention is $\leq 100$ Pa and $\geq 0.01$ Pa.

According to the present invention the vacuum can be adjusted in the range of $\geq 0.01$ Pa and $\leq 50$ Pa, preferred in the range of $\geq 0.01$ Pa and $\leq 10$ Pa and most preferred the vacuum is adjusted to the range of $\geq 0.01$ Pa and $<1$ Pa.

The fluorescent ceramic, after the step of single-axis hot-pressing under vacuum, can be further treated by air annealing at a temperature of 700° C. to 1200° C., preferably of 800° C. to 1100° C., more preferably of 900° C. to 1000° C.; whereby said time period for air annealing treatment is 0.5 hours to 30 hours, preferably 1 hours to 20 hours, more preferably 2 hours to 10 hours and most preferably 2 hours to 4 hours.

In an embodiment it is preferred that $Gd_2O_2S$ pigment powder used according to the present invention has an average grain size in the range of 2 μm to 10 μm and more preferably of 4 μm to 6 μm.

According to the present invention it is advantageous to introduce the vacuum annealing step for still further improving optical properties of resulting ceramics. During this step a further grain growth in the ceramics takes place which further improves transparency due to a decrease in porosity. Next to this, due to the grain growth an additional diffusion of dopant atoms in the lattice of oxysulfide enables still further improving scintillating properties of the ceramics.

Therefore, according to one embodiment of the method according to the present invention between step a) and step b) an additional step c) can be carried out, whereby step c) comprises annealing fluorescent ceramic under vacuum at a temperature of 1000° C. to 1400° C. for a period of time of 0.5 hours to 30 hours.

Preferably, the annealing temperature is selected in the range of 1100° C. to 1300° C., more preferably of 1200° C. to 1250° C.

The time period for vacuum annealing can be preferably set to 1 hour to 20 hours, more preferably to 2 hours to 10 hours and most preferably 3 hours to 5 hours.

EXAMPLE 1

The initial raw material $Gd_2O_2S$:700 wt. ppm Pr: 25 wt. ppm Ce and 0.5 wt. ppm Eu with a grain size of 5 µm is subjected to uniaxial hot pressure under vacuum of 1 Pa. The pressing temperature is 1250° C. and the pressure is 200 MPa followed by air annealing at about 1000° C. for 2 hours.

The obtained fluorescent ceramic material exhibits an afterglow characteristic of about 10 ppm at 0.5 s.

The fluorescent ceramic according to the present invention can be used for example in a scintillator or fluorescent member for detecting ionizing radiation, preferably x-rays, gamma rays and electron beams; and/or an apparatus or device used in the medical field, preferably for computed tomography (CT).

Most preferred at least one fluorescent ceramic according to the present invention can be used for a detector or apparatus adapted for medical imaging.

However, the fluorescent ceramic can be used for any detector known in the medical field. Such detectors are for example X-ray detector, CT-detector, Electronic Portal Imaging detector, and there like.

To provide a comprehensive disclosure without unduly lengthening the specification, the applicant hereby incorporates by reference each of the patents and patent applications referenced above.

The particular combinations of elements and features in the above detailed embodiments are exemplary only; the interchanging and substitution of these teachings with other teachings in this and the patents/applications incorporated by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A gadolinium containing pigment powder, comprising: europium of $\leq 1$ wt. ppm, and
cerium of $\geq 0.1$ wt. ppm to $\leq 100$ wt. ppm, wherein a content of cerium is in excess of a content of europium at a ratio of europium to cerium of 1:10 to 1:150, wherein said gadolinium containing pigment powder includes $Gd_2O_2S$:Pr with a grain size in a range of 1 µm to 5 µm.

2. The gadolinium containing pigment powder of claim 1, wherein the amount of cerium is $\leq 50$ wt. ppm.

3. The gadolinium containing pigment powder of claim 1, wherein the $Gd_2O_2S$:Pr has a surface in a range of one of $\geq 0.01$ m$^2$/g and $\leq 1$ m$^2$/g; $\geq 0.05$ m$^2$/g and $\leq 0.5$ m$^2$/g; or $\geq 0.1$ m$^2$/g and $\leq 0.2$ m$^2$/g.

4. The gadolinium containing pigment powder of claim 1, the gadolinium containing pigment powder further comprising: at least one of $Gd_2O_3$ or $Gd_2O_2S$.

5. The gadolinium containing pigment powder of claim 1, wherein the content of cerium is in excess of the content of europium at the ratio of europium to cerium of one of 1:20 to 1:100; 1:25 to 1:75; 1:20 to 1:50, or 1:25.

6. The gadolinium containing pigment powder of claim 1, the gadolinium containing pigment powder further comprising: at least one of Tb, Yb, Dy, Sm or Ho.

7. A method comprising:
detecting an amount of europium contaminate in a gadolinium containing pigment powder,
adding cerium in excess of a content of europium; so that a content of:
europium is verified to be $\leq 1$ wt. ppm, and
cerium is of $\geq 0.1$ wt. ppm to $\leq 100$ wt. ppm,
wherein the content of europium and cerium of the gadolinium containing pigment powder is adjusted at a ratio of europium to cerium of 1:10 to 1:150.

8. The method of claim 7, wherein the gadolinium containing pigment powder $Gd_2O_2S$:Pr.

9. The method of claim 8, wherein the $Gd_2O_2S$:Pr has a grain size in a range of 1 µm to 7 µm.

10. The method of claim 7, wherein the gadolinium containing pigment powder has a surface in a range of $\geq 0.05$ m$^2$/g and $\leq 0.5$ m$^2$/g.

11. The method of claim 7, wherein the gadolinium containing pigment powder has a surface in a range of $\geq 0.1$ m$^2$/g and $\leq 0.2$ m$^2$/g.

12. The method of claim 7, wherein the gadolinium containing pigment powder is $Gd_2O_3$.

13. The method of claim 7, further comprising:
using optical spectroscopy to detect the amount of europium contaminate in the gadolinium containing pigment powder.

14. The method of claim 13, comprising:
introducing the Ce from at least one of $CeCl_3$, $CeBr_3$, $CeI_3$, $Ce(NO_3)_3$, $Ce_2(SO_4)_3$ $Ce_2O_3$, $CeO_2$, $CeF_3$, $Ce_2O_2S$, $Ce_2(CO_3)_3$, or $Ce_2(C_2O_4)_3$.

15. The method of claim 13, further comprising:
using optical spectroscopy to measure an emission intensity of the europium contaminate in the gadolinium containing pigment powder.

16. The method of claim 15, comprising:
introducing the Eu from at least one of $EuCl_3$, $EuF_3$, $Eu_2O_2S$, $Eu_2(CO_3)_3$, or $Eu_2(C_2O_4)_3$.

17. A gadolinium containing pigment powder, comprising:
europium of $\leq 1$ wt. ppm, and
cerium of $\geq 0.1$ wt. ppm to $\leq 100$ wt. ppm, wherein a content of cerium is in excess of a content of europium at a ratio of europium to cerium of 1:10 to 1:150, wherein said gadolinium containing pigment powder includes $Gd_2O_2S$, $Gd_2O_3$ or $Gd_2O_2S$:Pr with a grain size in a range of 1 µm to 5 µm.

* * * * *